United States Patent Office.

ALEXANDER ANGUS CROLL, OF LONDON, ENGLAND.

Letters Patent No. 65,880, dated June 18, 1867.

IMPROVEMENT IN THE PURIFICATION OF COAL GAS.

The Schedule referred to in these Letters Patent and making part of the same.

TO ALL TO WHOM IT MAY CONCERN:

Be it known that I, ALEXANDER ANGUS CROLL, of Coleman street, in the city of London, England, civil engineer, have invented "Improvements in the Purification of Coal Gas;" and I do hereby declare that the following is a full and exact description thereof.

The improvements relate to the employment of sulphuric acid in a highly concentrated (and also sometimes in a heated) state with saw-dust or other vegetable matter, the degree of concentration of the acid being such as to effect the desired carbonization of the fibre without subsequent heating for that purpose. Sulphuric acid has heretofore been combined in various strengths of solution with vegetable matters, and the carbonization of the fibres has subsequently been obtained by raising the temperature of the combination by subsequent heating.

In carrying out my improvements I prefer to employ sulphuric acid of a specific gravity of about 1.700, or higher, at a temperature of about 270° Fahrenheit, or at such a temperature as can be obtained, having reference to the degree of concentration of the acid employed, and to combine it in the proportion of equal parts by weight thereof and of dry saw-dust, but varying the proportion with the absorbing power of the saw-dust. I, however, use by preference saw-dust obtained from soft wood, or such as possesses the largest absorbing power. The matters thus obtained are to be used in what are known as dry-lime purifiers.

My improvements also relate to the combined use of sulphuric acid, wood saw-dust, or other suitable open or porous substance, and sulphate of lime in the purification of coal gas. I prefer that the sulphuric acid I employ be in a highly concentrated and also in a highly heated state, say of a specific gravity of about 1,700, and at a temperature of about 270° Fahrenheit, and to combine it with the wood saw-dust in the proportion of say about equal parts by weight of the acid and of the dry wood saw-dust, and to the combination obtained I add sulphate of lime in the proportion say of one part by weight of the sulphate of lime to two parts by weight of the previous combination. These conditions may, however, vary.

In the purification of gas the combined matters may be placed in vessels, such as are commonly called dry-lime purifiers, or in other vessels adapted to effect the free action of the matters on the gas. If desired, the combined saw-dust or other porous matter and acid may be placed in one vessel to act on the gas, and the sulphate of lime combined with saw-dust or other suitable porous matter adapted to hold the lime open to act upon the gas in another vessel.

Having thus described my invention, I would have it understood that I do not confine myself to the precise details given, as these may be varied, but—

I claim the employment, in the purification of coal gas, of wood or vegetable matter when carbonized, substantially as herein described.

I also claim the employment of sulphate of lime in combination with the said carbonized matter, substantially as and for the purpose described.

In testimony whereof I have signed my name to this specification in the presence of two subscribing witnesses.

A. ANGUS CROLL.

Witnesses:
  JAMES E. NAYLOR,
  JNO. WILLSDON.